March 10, 1931. F. S. DENISON Re. 17,993

CIRCUIT MAKER AND BREAKER

Original Filed June 27, 1925 2 Sheets-Sheet 1

INVENTOR
FREDERICK S. DENISON
By Pauel, Pauel & Moore
ATTORNEYS

March 10, 1931. F. S. DENISON Re. 17,993

CIRCUIT MAKER AND BREAKER

Original Filed June 27, 1925 2 Sheets-Sheet 2

INVENTOR
FREDERICK S. DENISON
By Paul, Paul & Williams
ATTORNEYS

Reissued Mar. 10, 1931 Re. 17,993

UNITED STATES PATENT OFFICE

FREDERICK S. DENISON, OF MINNEAPOLIS, MINNESOTA, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

CIRCUIT MAKER AND BREAKER

Original No. 1,732,182, dated October 15, 1929, Serial No. 40,086, filed June 27, 1925. Application for reissue filed January 14, 1931. Serial No. 508,781.

This invention relates to new and useful improvements in the methods of and apparatus for controlling combustion mechanism and more particularly relates to such mechanisms having a fuel feeding apparatus which is electrically controlled. It is common especially in the art of oil-burners to employ thermostatically controlled burners which control not only effects the starting and stopping of the burner operation and fuel feeding but also ignition therefor. It is highly advantageous to employ a safety means which will automatically stop the fuel feeding upon failure of combustion of the fed fuel whether such failure of combustion occurs initially or intermediately during the fuel feeding. In this novel invention, a safety means is provided which is automatically operable upon starting of the fuel feeding to stop the same after a predetermined interval. This novel process and apparatus also includes the use of the combustion of the fuel as a control medium to render the safety means inoperative before completion of its stopping function and, further, this control medium may also be used to stop operation of an ignition means.

Further, this process provides the controlling of an electrically operated fuel feeding apparatus which consists in closing a circuit to the fuel feeding means to operate the same, providing an ignition means for the fed fuel, causing the safety means upon closure of the circuit to start functioning automatically to stop the fuel feeding after a predetermined interval, using the heat of combustion of the fuel as a control medium to render the safety means inoperative before completion of its function, and using the failure of combustion while said circuit is closed as a control medium to permit said safety means to function to stop the fuel feeding after a predetermined interval.

The object therefore of this invention is to provide a method of, and apparatus for, controlling combustion mechanisms.

Other objects of the invention will more fully appear from the following description and the accompanying drawings and will be pointed out in the annexed claims.

In the drawings there has been disclosed a structure designed to carry out the various objects of the invention, but it is to be understood that the invention is not confined to the exact features shown as various changes may be made within the scope of the claims which follow.

Figure 1:
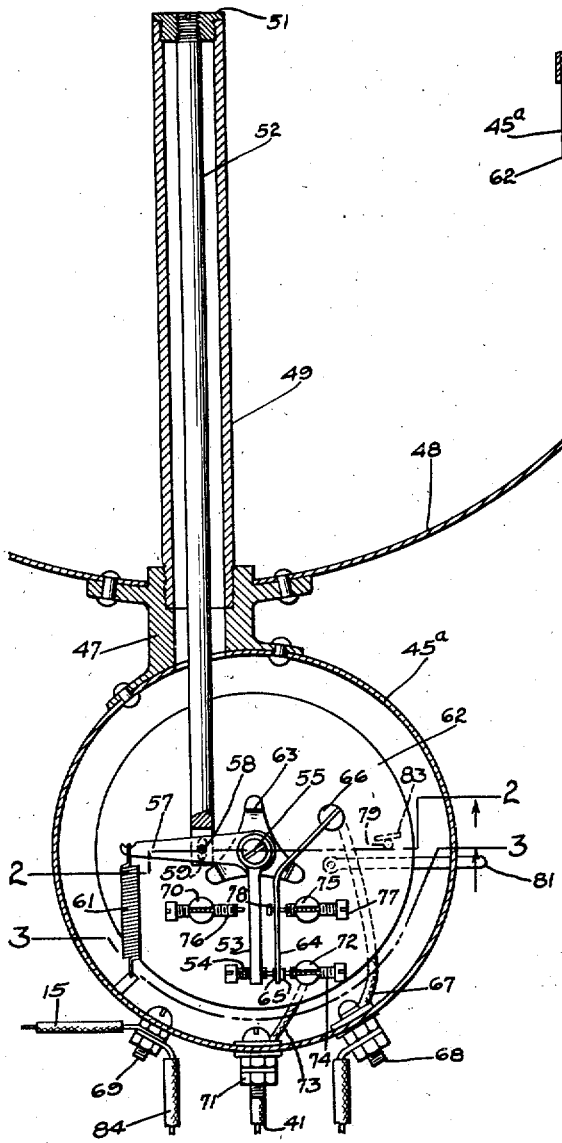
Figure 1 is a view in side elevation of a thermostatic member mounted so that its thermostatic element is responsive to the heat of combustion, the mounting being shown in section.

This novel process and apparatus may be explained and illustrated in conjunction with the relay control mechanism forming the subject-matter of the prior pending application of the inventor hereof Serial Number 722,586, filed June 26, 1924. Such mechanism, its construction and operation will be first described and then the automatic cut-out or safety switch and thereafter the device which is adapted to render inoperative the safety switch when the device is affected by the heat of combustion.

The fuel feeding device may include an electric motor 7 which is adapted to operate a blower to jet the fuel, such as oil, to the burner head, or to operate a centrifugal burner head with or without an oil pump. These parts are old and well-known in this art and need not be further illustrated or described. The motor 7 may receive electrical energy from the power lines 8 and 9 through a motor switch which is automatically controlled, as, for example, by a thermostat in the room or other place to be heated.

In the form here disclosed the thermostat comprises a substantially ring-like bar 11 which has securely attached thereto a relatively stiff metallic member such as the blade 12 formed of a bar of suitable metal which is an electric conductor. As the mechanism is preferably mounted in an upright position, the blade 12 depends from the thermo-bar 11. This ring-like bar is mounted, as is usual in insulated relation.

Two terminals are supported adjacent the bar 11 and are here indicated as terminally pointed contacts 13 and 14. The contact 13 is electrically connected to the wire 15 and the contact 14 is so connected to the wire 16.

The starting circuit is closed across the contacts 13—14 and, in the form shown, the circuit-closing means consists of a pair of members adapted to be successively engaged with their respective contacts. The relatively stiff blade 12 is carried by the thermo-bar 11 and is adapted to engage the contact 13 in order to form an electrical connection therewith. A second blade 17 is also carried by the thermo-bar 11 by means of its welding to the blade 12. The blades 12 and 17 are so arranged that they terminally diverge and each bears a contact tip 18. The contact tip of the flexible blade 17 is adapted to engage the end of the lower contact 14. This flexible blade 17 is also provided with an aperture 19 so that the other contact 13 may freely be passed therethrough, the resultant air gap providing sufficient insulation between the contact 13 and the flexible blade 17. This flexible blade is also desirably provided with a reinforcing or backing plate 21. The upper ends of the backing plate, the flexible blade 17 and the relatively stiff blade 12 are welded together to present a substantially unitary structure in electrical connection at that end. The plate 21 and blade 12 are both of relatively stiff metal and are disposed in terminally diverging relation, the flexible blade being interposed so that its flexibility permits movement of its major portion between the backing plate and blade 12. It may also be noted that the backing plate is provided with an aperture similar to the blade 17 for the same purpose. In addition to the thermostatic circuit wires 15 and 16, which are respectively connected to the contacts 13 and 14, a supplemental wire 22 is electrically connected to the thermo-bar 11, and hence to the blades 12 and 17.

The switch forming the subject-matter of the previously cited pending application may next be described in conjunction with its connections. The switch is preferably borne by a panel usually mounted in a vertical position. An electromagnetic coil 23 is mounted thereon to attract, when energized, an armature 24 having a weighted portion 25 and mounted upon a pivot pin 26. This armature lever has an arm 27 projecting beyond the pin 26 to engage and normally uphold a counterweight 28 connected to the parallel switch arms 29 each bearing a contact tip 31 for electrical engagement with the relatively fixed terminals of the main lead wires 32 and 33 from the power lines 9 and 8. These switch arms are pivotally mounted upon the pivot posts 34 and the counterweight 28 normally tends to retain each tip 31 in contact with the respective terminal contacts 35 of the lead wires 32 and 33, the opening movement being limited by the adjustable screw 36. Upon closure of these switch arms 29, electrical energy passes from the line 8 to the lead wire 33 to contact 35 to switch arm contact 31, through the switch arm to post 34 and, by wire 37 to the device, to be energized such as the burner motor 7, and thence returns by wire 38 to the other post 34, other switch arm 29, contacts 31—35, wire 32 to the other power line 9.

Thus, the counterweight 28 constantly exerts a gravitational force tending to hold the switch arms 29 in closed position. But, the armature weight 25 which exerts a greater force overcomes the force of the counter weight 28 and normally holds the switch-arms in open position. However, upon energization of the electromagnet 23, the force of the weight 25 is removed, and the counterweight may close the switch-arms where they remain until the electromagnet is deenergized whereby the weight 25 may indirectly open the switch-arms.

The energization and de-energization of the electromagnet is effected by means of the thermostatic mechanism above mentioned. The two switch-arms 29 are conventionally represented as tied together by the bar 39 because they function as a unit in pivotal movements upon their posts 34. The electromagnet 23 is in series with the wire 41 which is terminally connected to the secondary side of a transformer 42 which has its primary constantly energized by its shunt circuits 43—44 from the lines 32—33. The wire 16 leads from the other end of the secondary of this transformer to the thermostat control.

In the wiring diagram, the parts are represented in the positions occupied when the blower-motor 7 is shut off and the thermostat, usually positioned in the room or place to be heated, is warm enough to hold the blades from circuit-closing position so that the electro-magnet circuit is open at the posts 13 and 14. As the thermo-bar cools, the blades 12 and 17 and the backing plate 21 move toward the contacts 13 and 14. Owing to the divergent relation of these two blades, the relatively flexible blade 17 first engages the lower contact 14. In such position, the upper contact 13 is freely passed through the alined apertures in the plate 21 and blade 17 and is out of electrical connection therewith while the other blade 12 is spaced from its contact 13. The electromagnet circuit thus remains open, being broken at the post 13. Further movement of the cooling thermo-bar causes engagement of the stiff blade 12 with its contact 13. The backing plate maintains its spaced relation from the blade 12 while the blade 17 flexibly remains in contact with its contact 14. Thus the contacts are successively made and the electromagnet circuit is closed across the contact screws so that (if both contacts of the combustion thermostat are closed due to the cold condition of said thermostat) the electromagnet is energized, its armature weight 25 is raised which permits the weight 28 to drop and thus to move the switch arms into position closing the main line circuit to the motor. This circuit is as follows: one side of the secondary of transformer 42, 16, post 103, conductor elements 101, 99, 97, post 98, 16, 14, 17, 12, 13, 15, 69, 54, 64, 74, 71, 41, 34, 41, 23, 41 to opposite side of the secondary of the transformer. One of the switch arms 29 carries a short arm 45 which is electrically connected to the wire 41 leading from the electromagnet to the contact 13 through the combustion-affected thermo-switch as will be later described. However, this arm 45 is adapted, when the switch-arms are closed, to effect electrical engagement with the relatively fixed contact 46 which is connected by the wire 22 to the room thermo-bar 11. Thus, when the switch-arms are moved to circuit-closing position, the arm 45 by contact at 46 shunts the portion of the wire 41 connecting the post 34 and its normal circuit-continuation via the wire 15 to the post 13 of the room thermostat. This condition obtains so long as the electromagnet 23 remains energized and any accidental break in the current from the power line will deenergize the electromagnet and cause the motor circuit to be opened by force of gravity acting through the weight 25 which is heavier than the counterweight 28 and is therefore able to open the switch-arms 29 against the pull of the counter-weight 28.

However, disregarding such abnormal or accidental condition, the motor-switch-arms may be caused to be opened by movement of the thermo-bar 11 when it becomes heated and successively moves the blades 12 and 17 from their contacts. The circuit is not interrupted until the thermo-bar has moved a predetermined distance from the contacts. Such a lag in the breaking is provided by the use of the relatively stiff and flexible contact blades and the supplemental connection for the thermo-bar and blades. Thus, as the heating thermo-bar moves from the contacts, the stiff blade 12 is first disengaged from its post 13 and in such position, the contact 13 and its connections via wire 15 and wire 41 up to the supplementary switch arm 45 are de-energized but, the circuit from the electromagnet is maintained across the arm 45, fixed contact 46 and wire 22 to the thermo-bar 11 and flexible blade 17, contact 14, wire 16, transformer 42, and wire 41 to the electromagnet 23. The leads from the supply or power lines are thus maintained closed and supply electrical energy to the motor 7. When the thermo-bar has continued its opening movement for the predetermined distance or lag, the flexible blade 17 is moved from its contact 14 and the circuit is opened. The relatively stiff metallic backing plate 21 being movable with the blade 12 assures the opening travel of the flexible blade 17 in timed relation to that of the stiff blade 12. When the electromagnet circuit is thus opened, the armature weight 25 drops and, through the lever 27, rocks the lighter counterweight 28 of the switch-arms, moving the latter as well as the short arm 45 to open positions for a subsequent cycle of operations.

This novel process and apparatus forming the subject-matter of this application may be employed in conjunction with the above thermo-static control mechanism, which is in present use, as well as with other types but, as before stated, for purposes of explanation, it will be described and its operation pointed out in connection therewith.

The novel safety means featured in this invention and hereinbefore mentioned consists of an automatically operable circuit-breaker interposed in the relay circuit and also a thermostatically controlled device adapted to be mounted so as to be responsive to conditions of combustion automatically to affect the operation of the circuit-breaker to interrupt the fuel feeding means or burner motor in case of ignition failure upon initial starting of the fuel feeding means.

Figure 3:
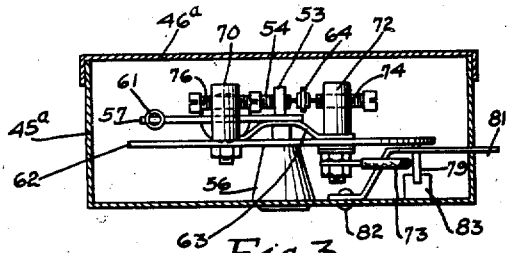
Figure 3 is a similar view on the line 3—3 of Figure 1.
Figure 2:
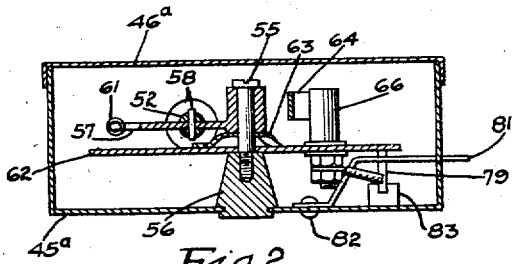
Figure 2 is a cross-sectional view on the line 2—2 of Figure 1.

The thermostatically controlled device will next be described and, as shown in Figures 1, 2 and 3, comprises the casing 45ª which preferably is open on one side as shown in Figures 2 and 3. A closure 46ª is provided to close the open side of the casing as shown to prevent dust and foreign material from getting thereinto and affecting the operating mechanism mounted therein. A flanged bracket 47 is secured to the casing 45ª, to provide a means for securing it to a supporting means such, for example, as the stack 48 of the furnace or heating plant. A thermo-element 49 has one end secured to the bracket 47 and inwardly projects into the stack 48 so as to be directly affected by the products of combustion when ignition takes place. A cap 51 is secured to the end of the thermo-element 49 and has a stem 52 secured thereto which extends through the thermo-element and into the casing 45ª, as particularly shown in Figure 1. The coefficient of expansion in the thermo-element 49 is obviously considerably greater than that of the stem 52 so that when ignition takes place and the element becomes heated it will relatively elongate sufficiently to cause the inner end of the stem 52 to be inwardly drawn towards the wall of the stack. A switch arm 53, having an adjustably mounted contact screw 54 mounted therein, is pivotally mounted upon a stud 55 mounted in a hub 56 secured to the casing wall as shown in Figure 2. The switch arm 53 has an arm 57 provided thereon which is connected to the inner end of the stem 52 by means of a pin 58 as shown. The aperture 59 in the stem 52, through which the pin 58 passes, is preferably elongated so as to permit the stem to relatively move with reference to the arm 57 when the contacts of the device are in circuit closing position as shown in Figure 1. A tension spring 61 has one end terminally secured to the arm 57 and its other end to the casing wall, thereby constantly exerting a pull on the arm which tends to move the switch arm 53, and therefore the contact 54, into circuit closing position.

A disc 62 is also mounted upon the stud 55 and is frictionally prevented from relative rotation thereon by means of a tension member 63 interposed between the lower face of the hub of the switch arm 53 and the upper face of the disk 62 which rests on hub 56. (See Figure 2.) A flexible contact member 64, having a contact tip 65 on each side thereof, is mounted in a stud 66 secured to the disc 62 as shown in Figure 1. A wire 67 electrically connects the stud 66 and therefore the contact member 64 with a terminal post 68 mounted in the wall of the casing in insulated relation thereto. When the thermo-element 49 is cold, as when before combustion takes place, the contact screw 54 will be moved into contact with one of the contact tips 65 of the member 64, thereby electrically connecting the terminal post 68 with a similar terminal post 69 mounted in the wall of the casing and not insulated thereform so that current may pass from the post 68 through the wire 67, flexible member 64, contact tip 65, screw 54, switch arm 53, stud 55 and through the casing wall to the post 69. A third terminal post 71 is also mounted in the casing wall in insulated relation thereto and is electrically connected to a post 72, mounted upon the disc 62, by means of a flexible connection 73. A contact screw 74 is adjustably mounted on the post 72 and is adapted to be engaged by the flexible contact member 64 to close a circuit between the terminal posts 68 and 71.

An important feature of this invention resides in the construction of the novel switch mechanism above described, and in the order in which the switch contacts 54, 65, 74 are moved into and out of circuit-closing and circuit-opening positions by the action of the thermo-element 49 which, as before stated, is directly responsive to conditions of combustion in the burner. These switch contacts are so arranged that the time interval required to move them into circuit-opening and circuit-closing positions may be varied to any desired degree. They are also arranged to successively open and close during each cycle of operation.

The means provided for controlling the timed relation between the opening and closing of the contacts preferably consists in mounting upon the disc 62 a pair of posts 70 and 75 having stop screws 76 and 77, respectively, adjustably mounted therein. The stop screw 76 is adapted to be terminally engaged by the switch arm 53—when moved into the position shown in Figure 5. The stop screw 77 has a headed pin 78 secured thereto which extends through an aperture in the flexible member 64 so that when the contact screw 54 is moved out of contact with the tip 65 of the member 64, as particularly shown in Figure 5, the member 64 will engage the head of the pin 78 which will thereby prevent its further movement, thereby allowing the contact screw 54 to be moved out of electrical contact with its complementary tip 65 of the member 64 as shown. Obviously the post 75 is insulated from the disc 62 in order to prevent the current from short circuiting between the posts 75 and 72. By adjusting the stop screws 76 and 77, the air gap between the contact screw 54, and its complementary contact tip 65 and also between the contact screw 74 and the other tip 65 on the opposite side of the flexible member 64, may be increased or decreased to obtain the desired time interval in the opening and closing of the contacts.

Figure 5:
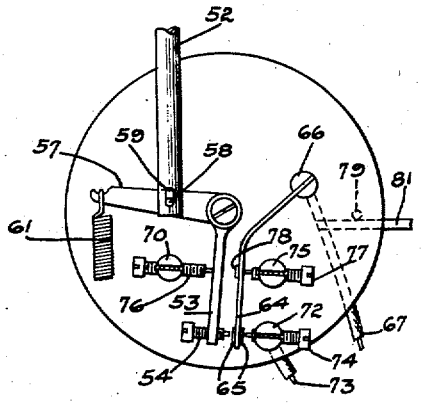
Figure 5 is a view similar to the foregoing but showing all contacts disengaged.

In the operation of the above switch mechanism, it will be noted that when the off-set arm 57 of the switch arm 53 is moved by the action of the thermo-element 49 the disc 62 will also tend to rotate upon the stud 55 as a result of the tension member 63 frictionally connecting it with the hub of the switch arm 53. Such rotation of the disc 62 with the arm 53 will cause the contacts to remain in closed position as a result of the flexible member 64 and the post 72 being carried by the disc. Means are therefore provided for interrupting the rotation of the disc at a predetermined period so that continued rotation of the switch arm upon the stud 55 will cause the switch contacts 54, 65, and 74 to be successively moved out of contact with one another as shown in Figure 5. The means provided for thus interrupting the rotation of the disc 62 preferably consists of securing a pin 79 to the disc so that it depends therefrom into the path of a small off-set lever 81 which has one end pivotally connected to the casing wall by means of a pin 82. The connection between the lever 81 and the casing wall is such that it will be frictionally held in its adjusted positions.

Figure 4:
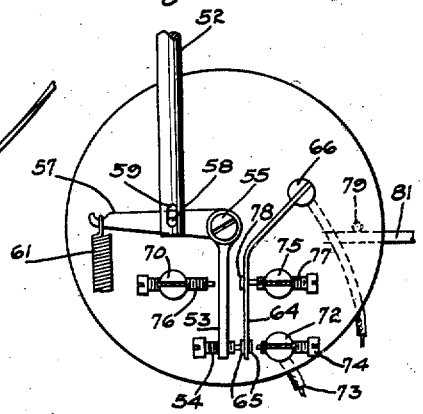
Figure 4 is a view of the disc and movable parts in the intermediate positions assumed when the two of the contacts are disengaged and two are still engaged.

Referring to Figure 1, it will be noted that the pin 79 is out of contact with the lever 81, thereby allowing the disc 62 to rotate with the switch arm 53 until the pin engages the lever 81 as shown in Figures 4 and 5. After the pin thus engages the lever 81 rotation of the disc will be interrupted and the switch arm 53 will continue to move followed by the flexible member 64, the tension of which tends to keep it in electrical contact with the contact screw 54. When the switch arm 53 reaches the position shown in Figure 4, the flexible member will engage the head of the pin 78 and its movement will thereafter cease, thereby allowing the contact screws 54 to be moved out of electrical contact with its complementary tip 65 of the member 64 as shown in Figure 5. Upon the return movement of the switch contacts, or when they are moved into circuit-closing position by the cooling of the thermo-element 49, the disc 62 will be rotated simultaneously with the switch arm 53 by the action of the spring 61 until the stop pin 79 engages a stop lug 83 mounted in the casing wall as shown in Figures 1 and 3. As soon as the pin 79 thus engages the stop lug 83, the switch contacts will be successively moved into electrical connection with one another as previously described. By mounting the disc and switch contacts, as above described, a predetermined clearance will always be maintained between the contacts when in open position, thereby always causing the ignition circuit to be presented a predetermined time after the burner has been interrupted and also before the circuit breaker circuit is prevented.

Although it has been shown that the disc 62 moves when the arm 57 is moved by the thermostat, and also that stops 81—83 limit disc motion when engaged by pin 79, yet it is obvious that this need not necessarily be so, and that these stops and pin may be dispensed with, if the contact surfaces between the elements 56—62 and lower surface of the hub of arm 57 and upper surface of tension element 63 are related in a certain manner. For example, if the contacting surfaces of disc 62 and post 56 are rough-machined and if, for example. they are made of brass, and if the lower surface of the hub of arm 57 and the upper surface of the spring 63 are well polished, the disc 62 will not be driven frictionally by the arm 57, but is frictionally prevented from moving, by tension member 63, until arm 53 engages stop or contact 76, or stop or contact 74, after which the disc will be moved if motion of arm 53 continues to move in the same direction. In such a case, then let it be assumed that the element 49 is heating. The elements 53 will then move in clockwise direction without moving the disc 62, the contacts 65, 74 will first be broken, and then the contacts 54 and 65, then the arm 53 will come in contact with the screw 76 and on continued motion in the same direction will entrain or move the disc. On cooling motion of the element 49 the arm 53 will move in counter-clockwise direction and the contacts 54—65 and 65—74 will be successively made.

After these contacts are made, and on continued motion of the element 49 in the same direction as it cools, the disc 62 will move in counter-clockwise direction. It is thus seen that the element 53 operates between two stops or contacts 76—74, both fixed to the disc, and element 53 alternately acts through these stops or contacts to move the disc alternatively in opposite directions. Thus, a pair of elements the equivalent of 53 and 62 are mounted to move independently of one another, one of these elements has a pair of contacts, or stops, 74—76, against which, or through which, element 53 operates, so that one element can alternately move the other in opposite directions. It is also seen that a rotatably mounted support 62, yieldably retarded against rotation is provided, and that this support has a pair of contacts and that there is an arm independently mounted and swingable against the contacts, or posts, or stops.

Figure 6:
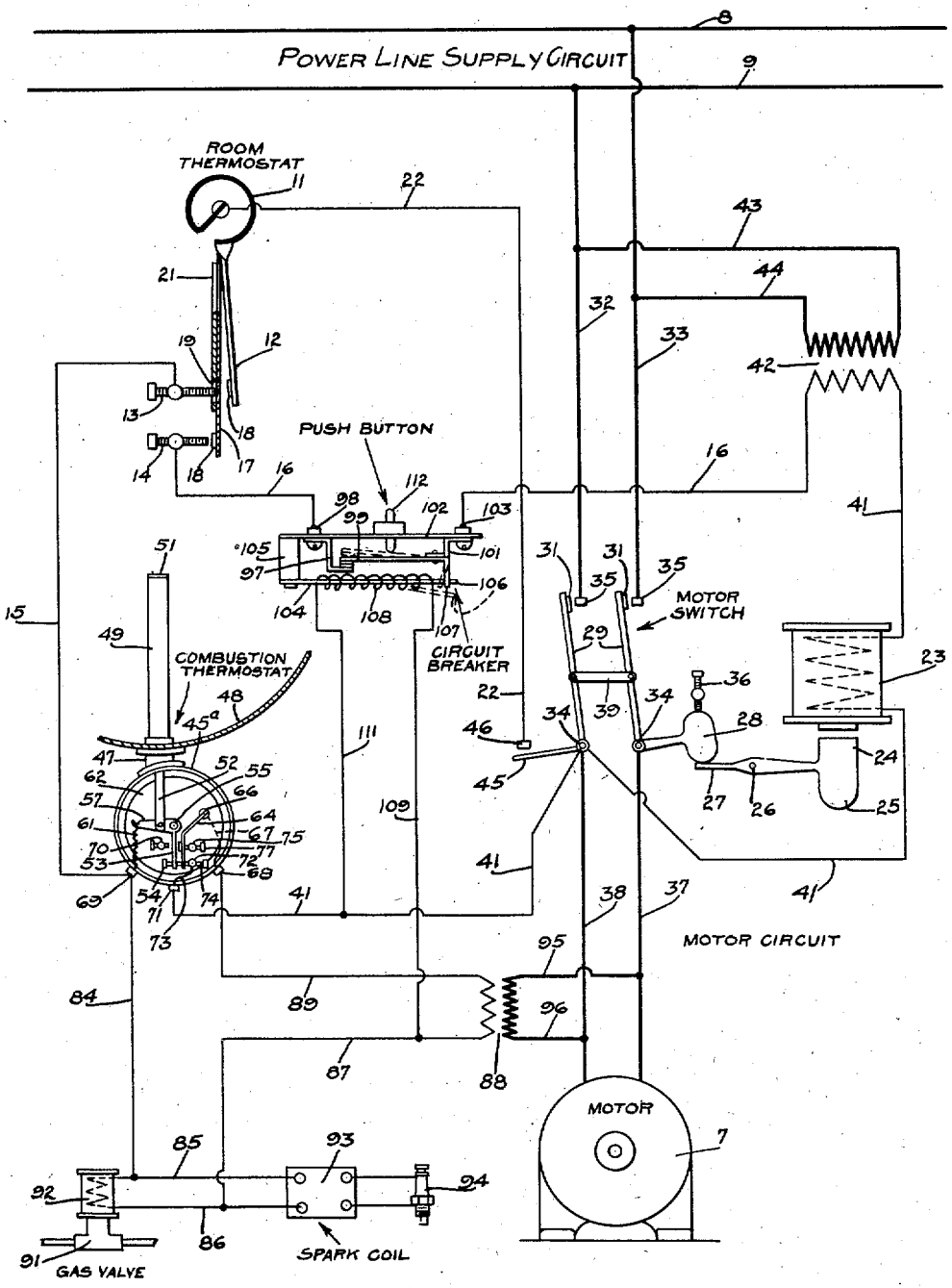
Figure 6 is a wiring diagram of the apparatus embodying the invention.

Referring to Figure 6, it will be noted that the wire 15 leading from the contact 13 of the room thermostat is connected to the terminal post 69 of the above described switch mechanism which will hereinafter be referred to as the combustion thermostat. A wire 84 also leads from the terminal 69 to one side of an ignition circuit comprising the wires 85 and 86, the latter being connected by a wire 87 to the secondary of a transformer 88 as shown. The other side of the transformer secondary is connected to the terminal 68 by means of a wire 89. The form of ignition means shown in Figure 6 preferably comprises a gas valve 91 which is automatically operable by means of a relay coil 92 connected in series with the wires 85 and 86 and therefore the secondary side of the transformer 88. A spark coil 93, of ordinary construction, also has one of its windings connected in series with the transformer 88 through the combustion thermostat while the high tension winding thereof is connected in series with a spark plug 94 as shown. The above described method of ignition is commonly known as a combination gas and spark and is well known in the art. The wire 41 leading from the post 34 of the motor switch is connected to the third terminal post 71 of the combustion thermostat. It will also be noted that the primary of the transformer 88 is electrically connected to the motor leads 37 and 38 by means of the shunt wires 95 and 96, as shown, so that the transformer will be energized whenever the motor switch is closed and the motor is operating.

The circuit-breaker, which is actuated by the action of the combustion thermostat, will next be described, after which the operation of the safety means will be described in connection with the thermostatically controlled relay circuit controlling the operation of the burner motor and therefore the fuel feeding means. The circuit-breaker shown diagrammatically in Figure 6, comprises a conductor strip 97 secured to a terminal post 98 to which is connected one end of the portion of the wire 16 leading from the contact 14 of the room thermostat. A movable switch arm 99 is secured to a resilient member 101 mounted upon a supporting strip 102 by means of a terminal post 103. The terminal posts 98 and 103 obviously are insulated from the supporting strip 102. One end of the portion of the wire 16 leading from the transformer 42 is connected to the terminal post 103. These two posts 98 and 103 are therefore electrically connected in series with the wire 16 which leads from the post 14 of the room thermostat to the transformer 42 so that the normal engagement of the switch arm 99 with the conductor strip 97 of the circuit breaker does not interrupt the thermostatically controlled circuit at the wire 16.

The means provided for automatically moving the switch arm 99 out of contact with the conductor strip 97 to break the circuit, in case of ignition failure, preferably consists of a thermo-bar 104 having one end secured to a support 105 secured to the supporting strip 102. The outer or free end of the thermo-bar has a reduced portion forming a tab 106 which is adapted normally to be received within an angular recess provided in the depending off-set end 107 of the movable switch arm 99 of the circuit breaker. A heating coil 108 is coiled about the thermo-bar and has one end connected by a wire 109 to the wire 87 leading to one side of the secondary of the transformer 88. The other end of the heating coil is similarly connected by a wire 111 to the wire 41 leading from the intermediate contact post 71 of the combustion thermostat to the post 34 of the motor switch. The circuit-breaker is so constructed and arranged that, upon the passage of current through the heating coil 108 for a predetermined interval, the thermo-bar 104 will be warped out of engagement with the off-set end 107 of the movable switch arm 99, which is mounted so that its inherent resilience will cause the arm 99 to assume the position shown in dotted lines in Figure 6 with the result that the switch arm 99 is moved out of contact with the conductor strip 97 and the thermostatic circuit is broken across the wire 16 and the relay, or electromagnet 23 is de-energized and the motor circuit is broken at the switch contacts 31. The apparatus can thereafter only be re-conditioned for normal operation by the manual re-setting of the circuit-breaker switch arm 99, such, for example, as by a push button 112, preferably mounted in the supporting strip 102 of the circuit-breaker.

In the operation of this novel safety means in connection with the thermostatically controlled relay circuit of the burner motor and fuel feeding means, the apparatus, after a predetermined room temperature is reached, will be in the position shown in Figure 6, wherein it will be noted that the contact blades 12 and 17 of the room thermostat are out of electrical contact with the posts 13 and 14. When thus positioned the circuit through wire 16 of the relay will be broken at the room thermostat thereby causing the electromagnet 23 to become de-energized, which will cause the motor switch to be automatically opened by the gravitational drop of the weighted portion 25 of the armature 24. Such opening of the motor switch will also cause the switch arm 45 to be moved out of electrical contact with the contact 46, whereby the holding circuit for relay 23 is broken. When the room thermostat and motor switch are in inoperative positions, as above described, the entire burner apparatus will be interrupted, thereby causing the thermo-element of the thermostat to cool with the result that the contacts 54, 65 and 74 will be moved into electrical connection with one another, as shown in Figures 1 and 6.

When the contacts of the combustion thermostat are thus closed, the wire 41 of the relay circuit will be electrically connected to the wire 15 leading to the room thermostat so that current may flow from the electro-magnet 23 through the wire 41, combustion thermostat, wire 15 to the post 13 of the room thermostat where it will be interrupted until the tip 18 of the blade 12 is moved into contact with the contact screw 13. It will also be noted that when the contacts of the combustion thermostat are in closed position, that the heating coil 108 and also the ignition means will be connected in series with the secondary of the transformer 88 so that when the burner motor resumes operation by the automatic closing of the motor switch by the action of the room thermostat that ignition will also be simuletaneously resumed.

As soon as the room temperature begins to lower the contacts 18 of the blades 12 and 17 of the room thermostat will move towards the contact screws 13 and 14 until the tip 18 of the blade 17 is moved into electrical connection with the contact 14. Such connection, however, will have no effect on the apparatus as a result of the blade 12 being out of contact with the contact 13, and also as a result of the separated relations of contact 46 and the blade 45. Further cooling of the room will cause the tip 18 of the blade 12 to be moved into electrical connection with the contact screw 13 thereby completing or closing the relay circuit which will be as follows:—From the secondary of the transformer 42 through the wire 16 and circuit breaker interposed therein, contact screw 14, blades 17 and 12, contact screw 13, wire 15, to the terminal post 69 of the combustion thermostat; through the casing of the latter to the contact screw 54, tips 65 of the switch member 64, post 72, connection 73 to the intermediate terminal post 71; thence through the wire 41 to the electromagnet 23 and back to the other side of the transformer secondary. Closing of the above circuit will cause the electromagnet 23 to become energized resulting in the armature 24 being upwardly drawn thereby resulting in the weight 28 dropping and automatically closing the switch arms 29. Such closing of the motor switch will cause the motor 7 and the ignition means to resume operation with the resultant operation of burner under normal conditions. Referring to Figure 6, on energization of the transformer 88 due to closure of the motor switch 29, the ignition, and coil 108 of the circuit breaker, are energized (both contacts of the combustion thermostat being now closed). The circuit for the ignition is as follows: one side of the secondary of the transformer 88, wire 89, post 68, wire 67, post 66, blade 64, contact 54, arm 53, stud 55, casing 45[a], post 69, wire 84, 92, 86, 87, to the opposite side of the secondary of the transformer 88. The circuit for the coil 108 is as follows: one side of the secondary of the transformer 88, 89, 68, 67, 66, 64, 72, 71, 41, 111, 108, 109, 87 to opposite side of the secondary of the transformer 88. As soon as combustion has thus been started, the heat of combustion will affect the thermo-element 49 causing it to elongate and thereby actuating the switch mechanism mounted in the combustion thermostat.

The first movement of the thermo-element 49 upon combustion resumption, causes one of the tips 65 of the blade 64 to be moved out of electrical contact with the contact screw 74, see Figure 4, thereby breaking the starting circuit to main switch operating device 23.

After breaking of the circuit mentioned, the current to the heating coil 108 is still maintained through the following circuit: from the lower side of the transformer secondary 88, 109, 108, 111, 41, 45, 46, 22, 11, 12, 13, 15, 69, 53, 54, 64, 66, 67, 68, 89, to the opposite side of transformer 88.

The electromagnet 23, however, will remain energized to attract the armature 24 as a result of the switch arm 45 being in engagement with the contact 46 and the blades 12 and 17 still being in contact with the screws 13 and 14. When the above condition exists the electromagnet circuit will be as follows:—From one side of the secondary of the transformer 42 through the wire 16 and circuit-breaker to the contact screw 14 of the room thermostat; thence through the blade 17, coiled thermo-bar 11, wire 22, contact 46, switch arm 45, wire 41 to the electromagnet 23 and thence back to the other side of the transformer 42.

If the element 49 continues to expand by application of heat, the contacts 65—54 are broken as shown in Figure 5, because of the continued motion of the arm 53 after the flexible switch member 64 has engaged its stop 78 as shown. The breaking of contacts 54—65 breaks the ignition circuit and the circuit to the heating element 108, and this inactive condition of 92 and 108 obtains until the room temperature rises sufficiently to cause contacts 12 and 18 to leave posts 13 and 14, at which time the circuit to the magnetic device 23 is broken and the entire apparatus rendered inoperative so that combustion ceases. Upon such interruption of combustion the thermo-element 49 of the combustion thermostat will begin to cool, and first present or close the ignition circuit after which the circuit-breaker circuit will be closed and the safety means positioned for the next cycle of operation.

It will be noted that sufficient electrical energy for closing relay 23, and raising armature 24 (closing motor switch 29) cannot be had, unless both contacts of the combustion thermostat are closed (due to the absence of flame or combustion) and unless the room thermostat has closed both of its contacts.

An important feature in the operation of the safety means including the combustion thermostat and circuit-breaker is that in case of temporary power failure and immediate resumption thereof when the burner is normally running and the room thermostat is in electrical contact with the contact screws 13 and 14, it will be impossible for the burner to resume operation until after the thermo-element 49 of the combustion thermostat has cooled sufficiently to present or close the ignition circuit before the electromagnet becomes energized to close the motor switch. This is accomplished by the timed relation of the opening and closing of the switch contacts in the stack thermostat which are so arranged that the ignition circuit is always closed before the motor or power feeding means is started after having been accidentally interrupted.

In the event of ignition failure when the fuel feeding means is started by the closing of the main motor switch by the indirect action of the electromagnet 23 and the room thermostat, the thermo-element of the combustion thermostat will not become heated, thereby causing the contacts 54, 65 and 74 thereof to remain in circuit-closing position so that current will flow through the heating coil 108 which will cause the thermo-bar 104 to warp and be moved out of contact with the off-set end portion 107, thereby causing the switch arm 99 to be moved out of electrical contact with the conductor strip 97 and thus opening the relay circuit with the resultant opening of the motor switch and therefore interruption of the fuel feeding means. After the circuit-breaker has thus opened the wire 16 the apparatus can only be re-conditioned or rendered operative again by the manipulation of the push button 112 to re-set the switch-arm 99 in circuit-closing position. It is also to be understood that the time required to open the circuit-breaker by the flow of current through the heating coil 108 is greater than that required by the thermo-element 49 of the combustion thermostat to open the circuit-breaker circuit to render it inoperative, so that upon normal operation of the burner the circuit-breaker will always remain in closed position. The initial starting operation of the burner ignition under normal conditions will be started simultaneously with the starting of the motor or fuel-feeding means, and at the same time current will be caused to flow through the heating coil 108 of the circuit breaker which circuit, however, will soon thereafter be opened through the combustion thermostat after combustion is started, after which ignition will subsequently be interrupted and the burner will continue to function until interrupted by the action of the room thermostat.

Having thus described my invention what I claim as new and desire to secure by Letters-Patent is:

1. A thermostatically operable device for opening and closing electric circuits, comprising in combination a thermo-element and a supporting means therefor, a contact movably mounted upon said supporting means and having a connection with said thermo-element, a rotatable disk, a flexible contact member mounted upon said disk and adapted to be engaged by said movable contact, a complementary contact also mounted upon the disk adapted to be engaged by said flexible contact member whereby upon actuation of said movable contact by the thermo-element, all of said contacts will be successively moved into and out of electrical contact with one another.

2. A pair of elements mounted to move independently one having a pair of contacts against which the other element operates so that one element can alternately move the other in opposite directions, a thermal device connected to move one of the elements.

3. A pair of elements mounted to move independently one having a pair of contacts, against which the other element operates so that one element can alternately move the other in opposite directions, and a thermal device connected to move one of the elements, and means for yieldably retarding the motion of that element which is not connected with said thermal device.

4. A pair of elements mounted to move independently one having a pair of contacts against which the other element operates so that one element can alternately move the other in opposite directions, a thermal device connected to move one of the elements, means for yieldably retarding the motion of that element which is not connected with said thermal device along with additional means for limiting its movements in opposite directions.

5. A pair of elements mounted to move independently one having a pair of contacts against which the other element operates so that one element can alternately move the other in opposite directions, a thermal device connected to move one of the elements, a switch arm operative between one of the pair of contacts and that element which operates between the contacts, and a third contact engageable with said arm to limit its movement toward the element when said element recedes therefrom toward the opposite contact of the pair, the arrangement being such that when the element is engaging that opposite contact, the switch arm is in circuit making condition only with the third contact.

6. A pair of elements mounted to move independently one having a pair of contacts against which the other element operates so that one element can alternately move the other in opposite directions, a thermal device connected to move one of the elements, means for limiting movements alternately in opposite directions of that element which is not connected with said thermal device, a switch arm operative between one of the pair of contacts and that element which operates between the contacts, and a third contact engageable with said arm to limit its movement toward the element when said element recedes therefrom toward the opposite contact of the pair, the arrangement being such that when the element is engaging that opposite contact, the switch arm is in circuit making condition only with the third contact.

7. A pair of elements mounted to move independently one having a pair of contacts against which the other element operates so that one element can alternately move the other in opposite directions, a thermal device connected to move one of the elements, means for yieldably retarding the motion of that element which is not connected with said thermal device, a switch arm operative between one of the pair of contacts and that element which operates between the contacts, and a third contact engageable with said arm to limit its movement toward the element when the element recedes therefrom toward the opposite contact of the pair, the arrangement being such that when the element is engaging that opposite contact, the switch arm is in circuit making condition only with the third contact.

8. A support rotatably mounted and yieldably retarded against rotation and having a pair of contacts, an arm independently mounted and swingable against the contacts and a thermal element arranged to swing the arm.

9. A support rotatably mounted and yieldably retarded against rotation and having a pair of contacts, an arm independently mounted and swingable against the contacts and a thermal element arranged to swing the arm, and having a lost motion connection therewith, and means yieldably urging said arm towards one of the contacts.

10. A support rotatably mounted and yieldably retarded against rotation and having a pair of contacts, an arm independently mounted and swingable against the contacts and a thermal element arranged to swing the arm and having a lost motion connection therewith, means yieldably urging said arm towards one of the contacts, said thermal element moving in one direction against the action of said yieldable means to draw it toward an opposite contact, and means to limit movement of the support in opposite directions when said arm is correspondingly moved by the thermostatic element and when in engagement with a contact.

In witness wehereof, I have hereunto set my hand this 10th day of January, 1931.

FREDERICK S. DENISON.